United States Patent
Zahlmann et al.

(10) Patent No.: US 6,788,519 B2
(45) Date of Patent: Sep. 7, 2004

(54) PRESSURE-RESISTANT ENCAPSULATED AIR-GAP ARRANGEMENT FOR THE DRAINING OFF OF DAMAGING PERTURBANCES DUE TO OVERVOLTAGES

(75) Inventors: Peter Zahlmann, Neumarkt (DE); Raimund Koenig, Sengenthal (DE); Bernhard Krauss, Berg (DE); Michael Waffler, Neumarkt (DE); Stefan Hierl, Neumarkt (DE)

(73) Assignee: Dehn + Soehne GmbH + Co.KG, Neumarkt (DE)

( * ) Notice: Subject to any disclaimer, the term of this patent is extended or adjusted under 35 U.S.C. 154(b) by 242 days.

(21) Appl. No.: 10/181,969

(22) PCT Filed: Jan. 11, 2001

(86) PCT No.: PCT/EP01/00291

§ 371 (c)(1),
(2), (4) Date: Aug. 6, 2002

(87) PCT Pub. No.: WO01/63710

PCT Pub. Date: Aug. 30, 2001

(65) Prior Publication Data

US 2003/0007303 A1 Jan. 9, 2003

(30) Foreign Application Priority Data

Feb. 22, 2000 (DE) .......................................... 100 08 126
Apr. 11, 2000 (DE) .......................................... 100 18 012

(51) Int. Cl.[7] ............................................... H02H 1/00
(52) U.S. Cl. ...................................................... 361/129
(58) Field of Search .................................. 361/120, 128, 361/129; 313/231, 238–244; 315/111.01, 335

(56) References Cited

U.S. PATENT DOCUMENTS

| 4,198,590 A | * | 4/1980 | Harris .......................... 315/335 |
| 4,481,630 A | * | 11/1984 | Box et al. ................. 372/38.03 |
| 4,755,719 A | * | 7/1988 | Limpaecher ................. 313/597 |
| 6,566,813 B1 | * | 5/2003 | Lehmann et al. ........... 313/621 |

FOREIGN PATENT DOCUMENTS

| FR | 2 589 015 | 4/1987 |
| JP | 01 311585 | 12/1989 |

* cited by examiner

Primary Examiner—Gregory J. Toatley, Jr.
Assistant Examiner—Boris Benenson
(74) Attorney, Agent, or Firm—Oblon, Spivak, McClelland, Maier & Neustadt, P.C.

(57) ABSTRACT

A spark-gap arrangement encapsulated in a pressure-proof housing, for diverting harmful disturbances due to overvoltage, including at least two electrodes disposed substantially opposite one another in a housing that is conductive or provided with a conductive coating, between which a discharge space is formed and which are insulated from the housing. In accordance with the spark-gap arrangement a trigger voltage to form a subsidiary spark gap in the discharge space can be applied directly by the conductive housing, so that by the subsidiary spark gap the main spark gap between the main electrodes can be ignited.

12 Claims, 9 Drawing Sheets

PRESSURE-RESISTANT ENCAPSULATED AIR-GAP ARRANGEMENT FOR THE DRAINING OFF OF DAMAGING PERTURBANCES DUE TO OVERVOLTAGES

DESCRIPTION

The invention relates to a spark-gap arrangement encapsulated in a pressure-proof housing, for the purpose of diverting harmful disturbances due to overvoltage, comprising at least two electrodes disposed substantially opposite one another in a housing that is conductive or provided with a conductive coating, between which a discharge space is formed and which are insulated from the housing, according to the precharacterizing clause of claim 1.

Encapsulated lightning guards with no blow-out function but with surface-gap discharge have been known in the state of the art for years and are marketed, e.g., under the protected trade names DEHNbloc or DEHNgap by the firm of DEHN+SÖHNE Gmbh+Co. KG. Lightning guards on a spark-gap basis for use in low-voltage power-supply systems accordingly include an electrode configuration disposed within a pressure-proof, insulated housing. The pressure-proof housing itself is formed by a metal jacket. By varying the configuration of the electrodes, various response-voltage values can be achieved. The customary dynamic value of the response voltage in known spark-gap lightning guards is about 4 kV. In these solutions according to the state of the art, the response voltage is predetermined by the distance between the electrodes or can be adjusted.

Particularly in applications involving the protection of electronic devices in the area of information technology and data processing, however, it is desirable for the response voltages to be lower, in the region of ca. 1.5 kV. The small electrode separations required, however, cannot be achieved without additional provisions and/or technological complications.

In guards of the blow-out type, which are unencapsulated, it is possible to lower the response voltage by providing an additional trigger electrode. This trigger electrode, in combination with an electrical triggering device comprising a triggering transformer, causes ignition of a subsidiary spark gap with the result that ignition of the main spark gap is initiated immediately thereafter.

The construction of a spark gap with trigger electrode along with associated triggering device will now be explained in detail with reference to FIG. 1. After the gas diverter (GDT) shown there has been ignited, a pulse transformer TR generates an ignition voltage such that it ignites the subsidiary spark gap $F_1$ and, immediately thereafter, the main spark gap $F_2$.

The response of the subsidiary spark gap $F_1$ is thus initiated by ignition of the gas diverter. The response voltage of gas-filled overvoltage diverters can be varied over quite a wide range and is unproblematic for voltages below 1 kV. The quasi-external subsidiary ignition is amplified by the pulse transformer TR to a voltage level that can reliably ignite the above-mentioned subsidiary spark gap $F_1$.

Figure 1:
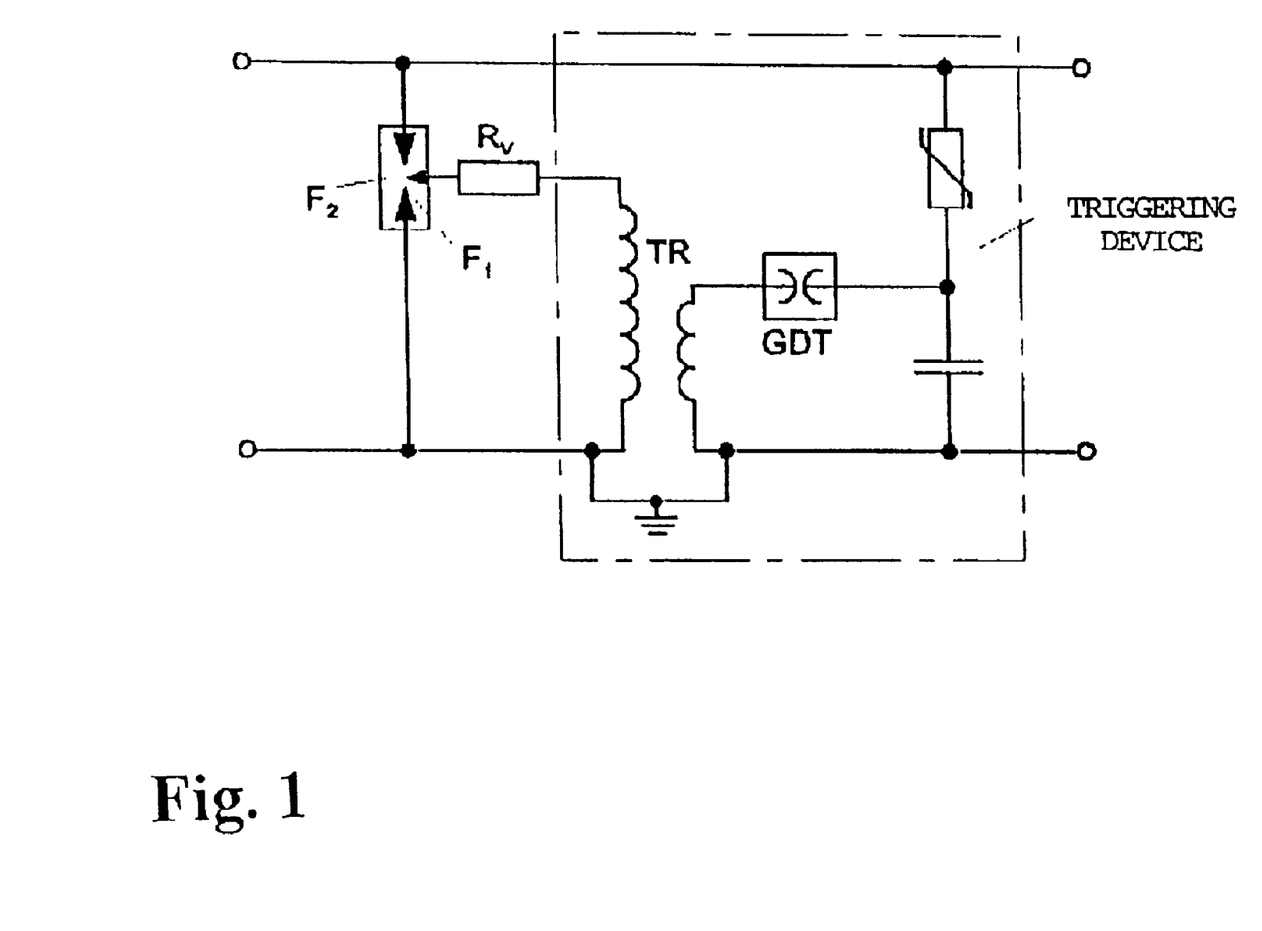
FIG. 1 is a block diagram of a spark gap with accessory or trigger electrode and associated triggering device according to the state of the art.

Hence with a known arrangement according to FIG. 1 it is possible to ignite the spark gap with small input voltages, and thus to achieve the desired protection at low voltage levels, e.g. 1.5 or 2 kV.

In order to apply this proposed method to spark gaps in a pressure-proof encapsulation, it would be necessary to solve the structural problem of inserting a high-voltage trigger electrode through the capsule wall in a pressure-tight manner and making electrical contact with said electrode.

However, this can be achieved only with considerable effort during manufacture and hence is associated with higher costs.

It is thus the objective of the invention to disclose a spark-gap arrangement encapsulated in a pressure-proof manner that comprises at least two electrodes disposed substantially opposite one another in a housing that is conductive or has a conductive coating and forming between them a discharge space, such that the arrangement makes possible a low response voltage in the range of $\leq 2$ kV with no need to employ trigger electrodes known per se, which must extend externally or be electrically connected outside the capsule.

The objective of the invention is achieved with an object having the characteristics given in claim 1, while the subordinate claims present at least useful embodiments and further developments.

Accordingly, the basic idea underlying the invention is that the metallic housing or metal jacket of the pressure-proof encapsulation of the spark-gap arrangement is used indirectly as trigger electrode, so that a triggering and hence a reduced response voltage can be achieved with no additional elaborate meaures. Preferably the electrodes of the spark-gap arrangement are so shaped as to form a cavity that is quasi closed off toward the interior, such that parts of the outer surfaces of the electrodes are situated in the immediate vicinity of the metal jacket of the housing or a metal coating, being separated therefrom by a relatively thin insulating layer. By this means the outer surface of the jacket or a metallic coating applied thereto can be used as trigger electrode.

The embodiment in which the electrodes form a cavity offers a substantial advantage in that the arc that is generated is surrounded entirely by electrode material, which resists burning away, so that the stress imposed on all the other structural parts by the arc can be considerably reduced. As a result, in combination with the electrode arrangement, even very large pulse currents can be reliably controlled in an extremely small space.

In the case in which high-energy ignition pulses between the electrodes are needed to trigger the main spark gap, and there is a risk of damage to the metal jacket of the housing, in the interior of the housing there is provided a coating of materials resistant to burning away, such as tungsten-copper. Triggering elements provided within the housing that are in electrical contact therewith can extend for different distances into the discharge space or arcing chamber and can also subdivide these spaces into geometrically separated regions, which has positive effects with respect to optimizing an ability to extinguish secondary currents, because in this special configuration of the triggering elements it is possible to generate partial arcs arranged in series.

In another embodiment the trigger electrodes provided in the interior of the housing can consist of a conductive plastic, such as polymethylene oxide (POM). The advantage derived here is that the tendency of the trigger electrode to burn away is similar to that of the insulating material present in the arcing chamber. Because of the release of conductive particles from the plastic that results from the action of the arc, the ignition energy that causes flash-over across the spark gap can be further reduced, so that with relatively little ignition energy large flash distances can be achieved.

If a plastic is chosen that gives off gas, in addition the ability of the spark-gap arrangement to extinguish secondary currents can be further improved.

When the material used for the trigger electrode is a relatively high-resistance, conductive plastic, the bulk resistance of the plastic material can be used to optimize the triggering circuit. As a result, an external protective resistor such as is required in the state of the art is no longer needed, and there is no danger that partial currents will flow over the externally provided wiring. That is, the bulk resistance of the plastic prevents an undesired fraction of the secondary current from flowing through an external pulse transformer.

Hence in accordance with the invention it becomes possible to apply a triggering voltage by way of the conductive housing in order to form a subsidiary spark gap in the discharge space, such that by way of the spark generated in the subsidiary gap within the housing the actual main spark gap between the electrodes can be ignited with little energy.

Preferably the insulation disposed between the discharge space and the housing is interrupted to form an opening in the region of the subsidiary spark gap.

Within this opening in the insulation can be disposed an insulating electrode spacer, adjusted to the shape of the housing and preferably annular, which incorporates at least one slit-like aperture or bore for the path of the subsidiary spark gap.

The electrodes enclosing the discharge space, and disposed opposite one another, can have a concave shape so as to produce the desired quasi-closed cavity.

Furthermore, within the opening in the insulation there can be disposed a insert made of a conductive material resistant to burning away, which is in contact with the conductive housing, projects into the discharge space and takes over the function of an internal trigger electrode. This insert then is connected to the conductive inner wall surface of the housing or to the metal housing capsule itself. By way of the projecting insert of, e.g., tungsten-copper material, it is possible both to produce a preliminary ignition and to generate the main arc. If an insert is provided in a multiple arrangement, e.g. in the form of a slotted disc, several main arcs can be created between the insert and the associated electrode, so that the arc voltage is multiplied or increased.

It is further preferred for the main electrodes to have a conical shape such that they point toward one another, the above-mentioned conductive insert being directed toward the opposite cones and serving to form the subsidiary spark gap on one hand but also, at a greater distance from the main electrodes, the main spark-gap or gaps.

The conductive insert can be shaped at its outer boundary like a disk adapted to the shape of the housing, with an opening the inner ends of which are reduced in thickness and aim toward the electrodes, which are preferably conical. By varying the geometrical parameters it is possible to influence the ignition behavior or the maximal arc voltage over a broad range, with no need to alter the basic shape or basic configuration of the spark-gap arrangement. With a standard housing various electrode inserts can be used as well as trigger electrodes of various shapes, so that a specific product can be adapted to suit different cases of application.

The above-mentioned conductive insert, which acts as trigger electrode, can be designed as a ring with several bridges that extend toward its center, so that the distances between the bridges and the ring form at least part of the discharge space.

In another embodiment of the invention there can be disposed within the opening in the insulation an insert made of conductive plastic and extending at least partly into the discharge space, as has been described above.

A design such that the spark-gap arrangement is rotationally symmetrical with respect to the middle long axis and has a mirror-symmetric shape perpendicular to the middle long axis, as viewed in section through the region of the opening in the insulation, leads to structural simplifications and ensures stability of the electrical parameters.

An alternative embodiment of the invention, without departing from the same basic idea, provides that in the region delimited by the opposed electrode surfaces and the inner surface of the housing, apart from a section assigned to the discharge space, a gas-emitting insulation material is disposed. Embedded in or introduced into the insulation material is at least one trigger electrode, which is connected to the conductive housing, i.e. makes electrical contact therewith. If in this case the trigger electrode is asymmetrically disposed in the space between the electrodes, the subsidiary spark gap is formed across the small distance separating one of the electrodes from the trigger electrode, so that after ignition of the subsidiary gap the actual main spark gap between the main electrodes becomes ignited.

Altogether, the spark-gap arrangement presented here succeeds, by employing a pressure-proof, conductive, as a rule metallic encapsulation, in creating an internal trigger electrode by means of which low response voltages can be ensured, for instance in order specifically to protect electronic devices for data processing or information technology, with no need to maintain minimal distances between the main electrodes; given dynamic response-voltage levels of 4 kV, the inter-electrode distances are already in the range 0.3 to 0.5 mm.

The main electrodes, which form or enclose a cavity, provide protection and reduce burning away of the remaining structural components, so that additional improvements are produced with respect to the long-term stability of a spark-gap arrangement thus constructed. The configuration of the inner trigger-electrode elements allows the arc to be fundamentally subdivided or split into several parts, so that the extinguishing properties of the arrangement can be improved.

In the following the invention is explained with reference to an exemplary embodiment with the assistance of drawings, wherein.

The spark-gap arrangements presented in the exemplary embodiment are of the kind that comprises main electrodes 1 and 2 that are disposed substantially opposite one another and for the purpose of electrical connection extend out of a pressure-proof, conductive housing 3 from which they are electrically insulated by means of a suitable material 4, sealing the opening through which they extend.

Figure 3:
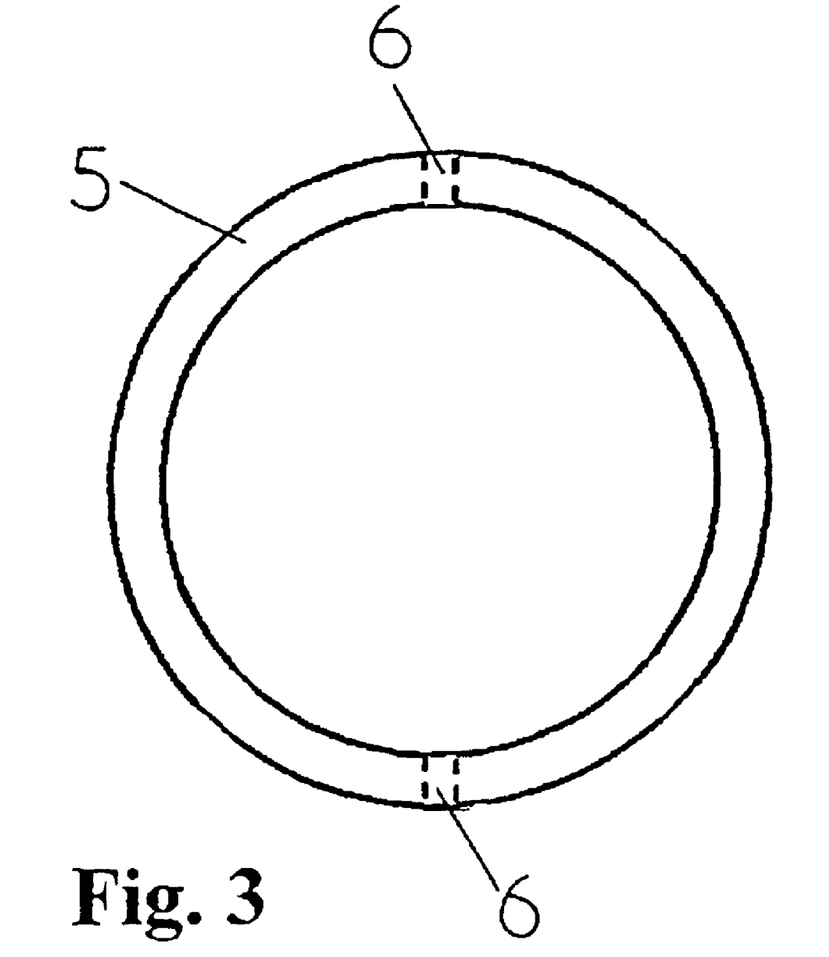
FIG. 3 shows an insert ring serving as a spacer, for use with an embodiment according to FIG. 2.

The main electrodes 1 and 2 are spaced apart from one another by an insulating ring 5. Details of the insulating ring 5 can be seen in FIG. 3. This figure also makes clear that the insulating ring 5 comprises at least two apertures or bores 6. At the positions of the bores or apertures 6 a subsidiary spark gap can form between the conductive housing 3 and one of the electrodes, in the example shown here the main electrode 1. This subsidiary spark gap causes preliminary ionization and subsequent ignition of the main spark gap between the main electrodes 1 and 2.

Figure 2:
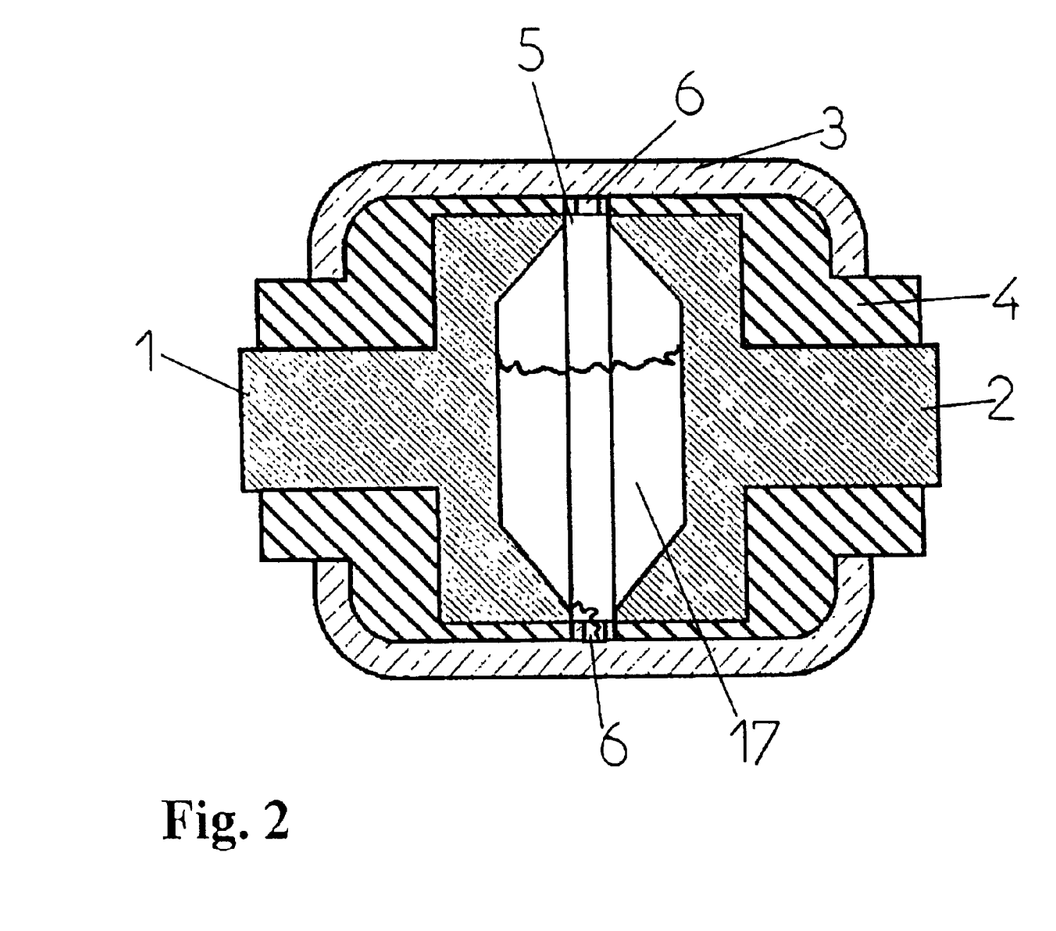
FIG. 2 shows a first embodiment of the spark-gap arrangement with main electrodes that enclose a cavity.

In the example shown in FIG. 2 the main electrodes 1 and 2 have a concave shape, producing a quasi-enclosed cavity that forms a chamber-shaped discharge space. Because the arc is entirely surrounded by the material of the electrodes 1 and 2, which resists burning away, the stress on the remaining structural elements caused by the generated arc is considerably reduced, so that even high pulse currents in an extremely small space can be reliably controlled.

In the case of high-energy ignition pulses, used to ignite the subsidiary spark gap with subsequent ignition of the main spark gap, there is a risk that the conductive housing 3 will be damaged on its inner surface.

Figure 4:
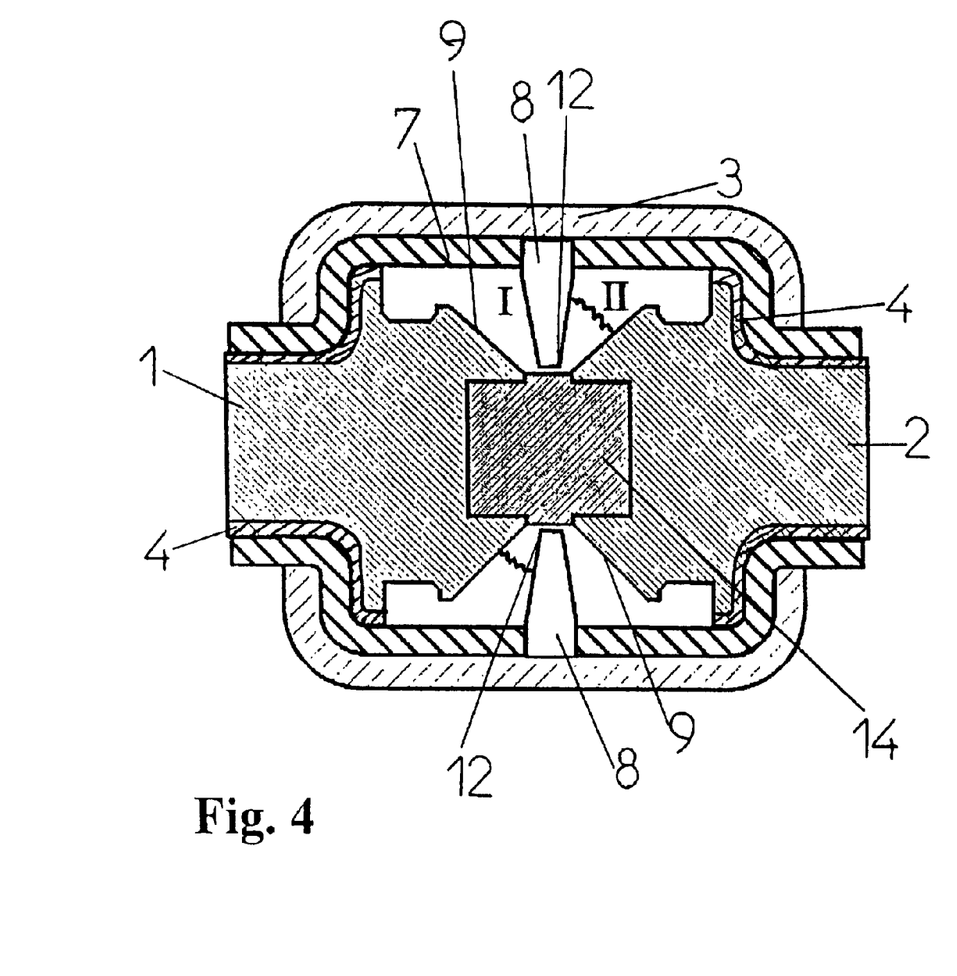
FIG. 4 shows another embodiment of the spark-gap arrangement with main electrodes in a conical shape and with an insert made of material that is resistant to burning away, to form the trigger electrode.

To avoid this disadvantage, in an exemplary embodiment as shown in FIG. 4 it is proposed to provide the interior of the conductive housing 3 with a coating or an insert 7 that is resistant to burning away. This resistant insert 7 can be made, for example, of a tungsten/copper material.

FIG. 4 further makes clear that it is possible to dispose a conductive trigger-electrode insert 8 within the housing 3 or the burning-resistant insert 7 in such a way that the geometric separation of the arcing chamber or discharge space thus produced has positive effects on the ability to extinguish secondary currents, because partial arcs arranged in series are formed. That is, a first partial arc burns from the first main electrode 1 onto the conductive trigger electrode 8, whereas the second partial arc runs from the latter to the main electrode 2.

The distance separating the conductive trigger-electrode insert 8 from the main electrodes 1 and 2 determines the breakdown voltage of the arrangement. By altering the geometry this voltage value can be varied over a wide range.

The main electrodes 1 and 2 according to FIG. 4 are shaped like cones pointing toward one another, and the subsidiary spark gap is formed between the conductive trigger-electrode insert 8 and the cones 9 on the opposite side. Electrical contact with the conductive trigger electrode or the trigger-electrode insert 8 is brought about by its contact with the conductive housing 3 and by a means for external connection (not shown).

Figure 6:
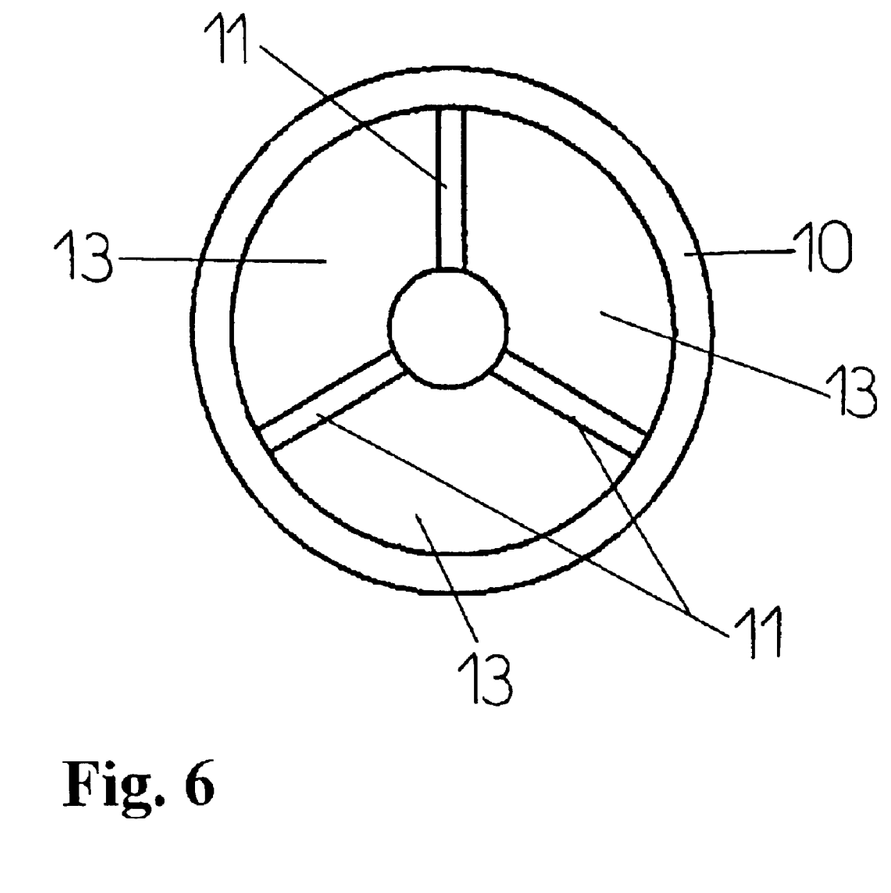
FIG. 6 is a detail drawing of the insert for use with an arrangement according to FIG. 5.

For application of the arrangement as a separative spark gap, in which case it is not necessary to extinguish a secondary current, it is advantageous for the arc voltage to be as low as possible. As a result, the energy turnover and hence wear and tear on the arrangement is slight. In this case the conductive trigger-electrode insert 8 can be so designed that, as shown in FIG. 6, it is based on a conductive ring 10 with bridges 11. Here the main spark gap is formed only between the main electrodes 1 and 2, while the trigger ignition behavior remains substantially unchanged.

The conductive trigger-electrode insert 8 can have the form of the above-mentioned ring but can also be shaped like a disc, with an opening in the disc or the ring. The inner ends 12 of the opening are reduced in thickness, for instance taper continuously, and are directed toward the main electrodes 1 and 2.

The distances or free spaces 13 between the bridges 11 in the ring 10 as shown in FIG. 6 form part of the discharge space in the embodiment of the spark-gap arrangement according to FIG. 5, and here again a burning-resistant insert 7, made for instance of tungsten-copper, is positioned within the interior of the conductive housing 3. Alternatively, the insert 7 can be made of a gas-releasing insulation material, e.g. POM.

As can readily be seen in FIGS. 2 to 8, in the exemplary embodiments presented here the basic idea is a spark-gap arrangement characterized by a rotationally symmetrical construction with respect to the middle long axis and a mirror-symmetric form perpendicular to the middle long axis, as seen in section through the region of the insulating ring 5 or the ring 10. Such an arrangement can be well controlled with respect to technology and has favorable properties in terms of pressure resistance.

It goes without saying that the principle in accordance with the invention, of using the conductive housing in an encapsulated spark-gap arrangement to serve as a trigger electrode, can also be applied and transferred to other forms of housing.

Figure 5:
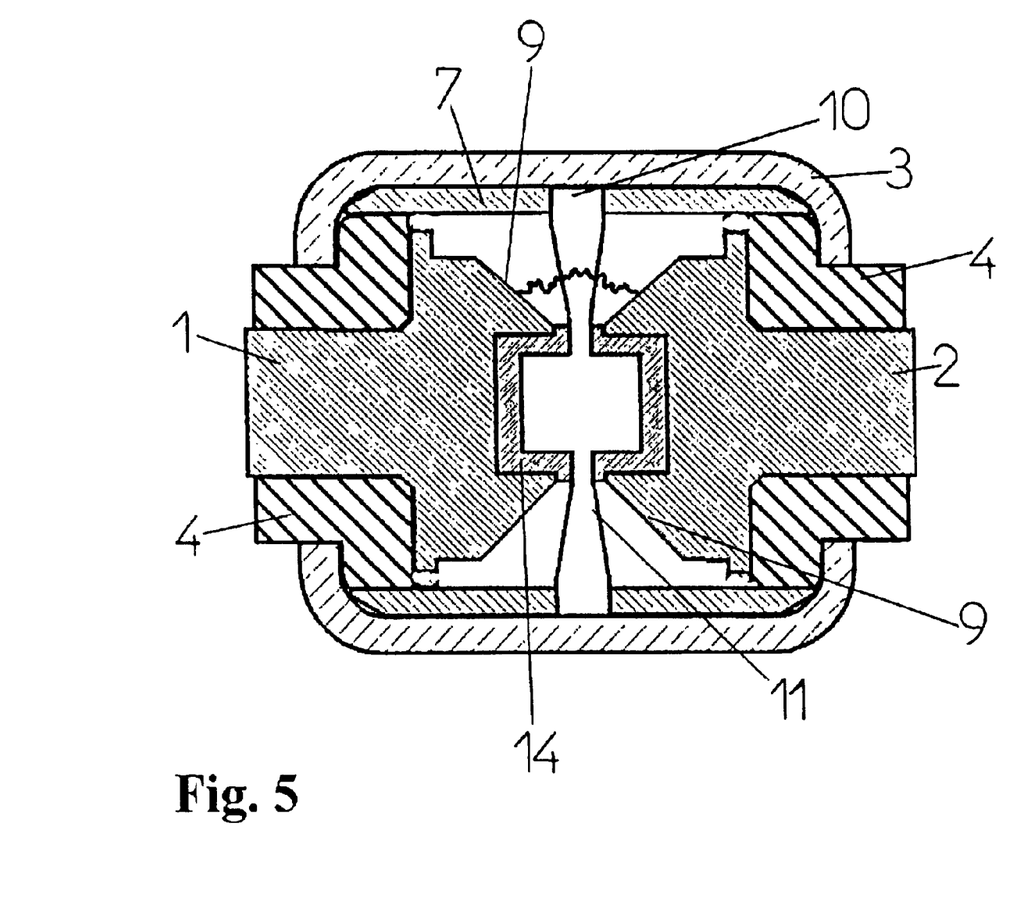
FIG. 5 shows an embodiment similar to that in FIG. 4 with a conductive, annular insert that comprises centrally directed bridges.

The conically constructed electrodes according to the embodiments shown in FIGS. 4 and 5 are kept centered and positioned by an insulating block 14, which according to FIG. 5 can also be constructed as a bipartite insert to accommodate the ring 10 with bridges 11.

Figure 7:
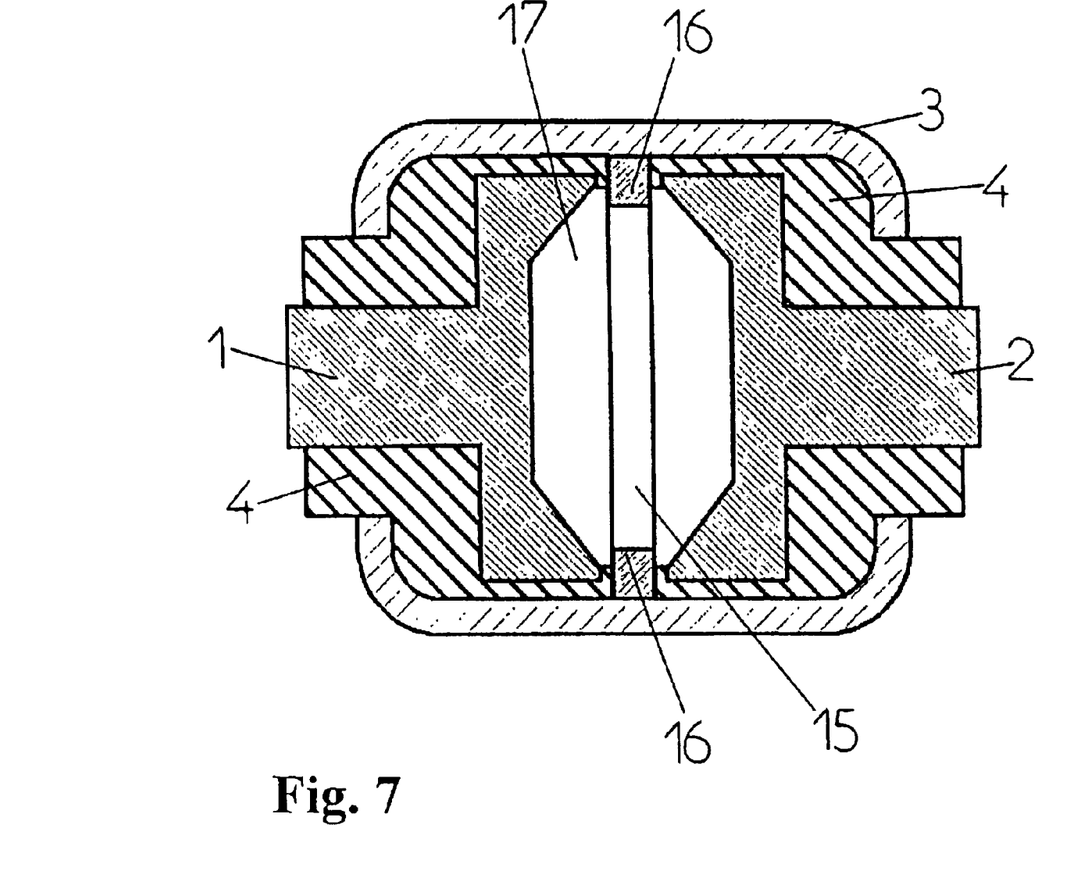
FIG. 7 shows a spark-gap arrangement with an insert made of conductive plastic that projects at least partly into the discharge space.
Figure 8:
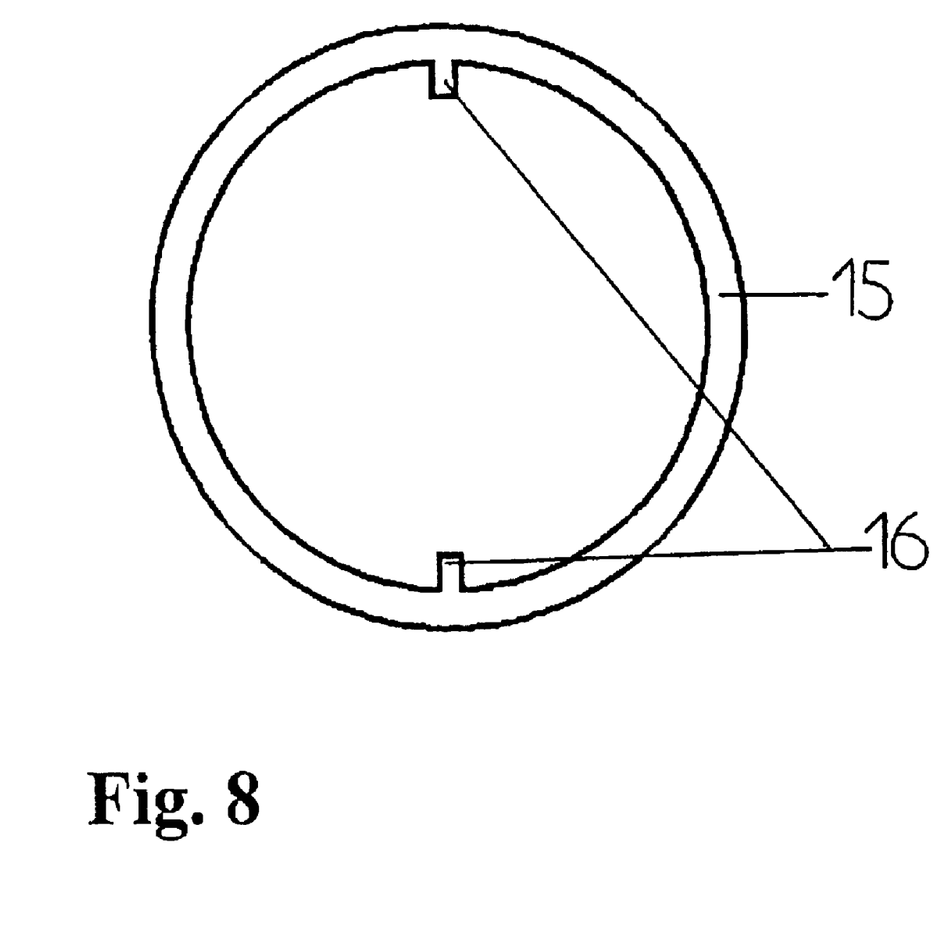
FIG. 8 is a detail drawing of the plastic insert for use with an arrangement according to FIG. 7.

In another embodiment of the spark-gap arrangement, shown in FIG. 7, an annular insert 15 made of a conductive plastic such as POM is provided. This annular conductive plastic insert 15 comprises projections or lugs 16 that serve as trigger electrodes. As is evident in FIG. 7, the annular conductive plastic insert, shown in detail in FIG. 8, is in electrical contact with the conductive housing 3 so that the triggering voltage can be applied. In the embodiments according to FIGS. 7 and 8, with a conductive plastic insert as trigger electrode, the advantage consists in the fact that both the trigger electrode and the insulating material 4 within the arrangement have approximately similar burning-away properties.

An additional advantage is that under the influence of the arc the inserted plastic can give off conductive particles, such as graphite, so that the ignition energy needed for flash-over across the spark gap in the discharge space 17 can be considerably reduced. Furthermore, the plastic materials can be chosen so that they give off a gas, such as $H_2$, so that the arrangement's ability to extinguish secondary current can be improved.

Figure 9:
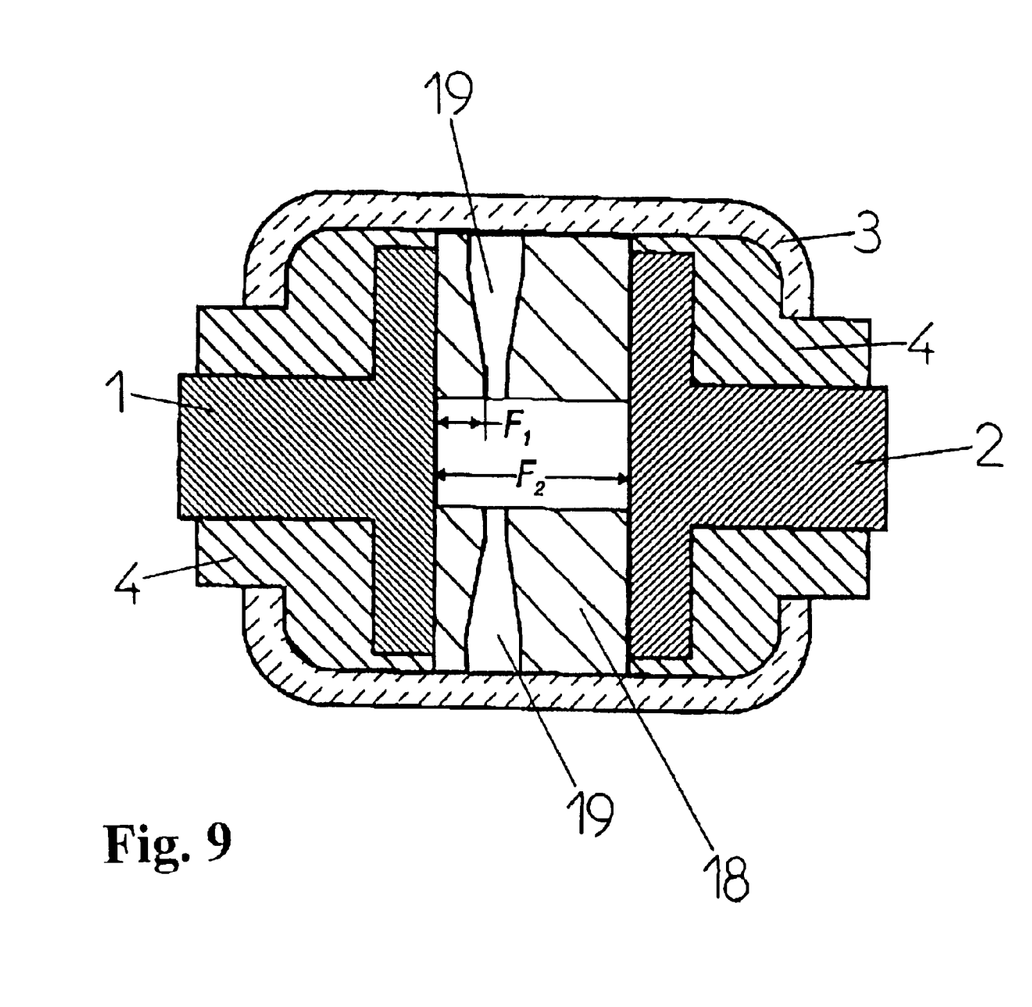
FIG. 9 shows another embodiment of a spark-gap arrangement with trigger electrodes disposed asymmetrically in the space between the main electrodes.

In the spark-gap arrangement according to FIG. 9 the discharge space 17 is completely surrounded by a gas-emitting insulation material 18. Embedded in this gas-emitting insulation material 18 is at least one conductive trigger electrode 19, which extends as far as the discharge space 17. Because of the asymmetrical arrangement of the embedded conductive trigger electrode 19, spark gaps of different dimensions are formed. By way of the trigger electrode 19, as shown in FIG. 9, first the subsidiary spark gap $F_1$ can be ignited, with the consequence that this preliminary ignition ionizes the main spark gap $F_2$, so that the latter itself ignites and the arc over the gap $F_1$ is extinguished.

In the case in which a conductive plastic is used for the trigger electrodes, the specific resistance of the plastic material can replace a protective resistor that would otherwise be needed in the known state of the art, so that the risk that a current or part of a current will flow by way of the external wiring is reduced. That is, the specific or bulk resistance of the plastic that is present in this case prevents an undesired secondary current component from flowing through an external pulse transformer that is connected to the trigger electrode or the exterior of the housing.

| List of reference numerals | |
|---|---|
| 1, 2 | Main electrodes |
| 3 | Conductive housing |
| 4 | Insulation material |
| 5 | Insulating ring |
| 6 | Bore or apertures |
| 7 | Burning-resistant insert |
| 8 | Conductive trigger-electrode insert |
| 9 | Cone |
| 10 | Ring |
| 11 | Bridges of the ring 10 |
| 12 | Tapering inner ends |
| 13 | Distances, free spaces |
| 14 | Insulation block |
| 15 | Annular conductive plastic insert |
| 16 | Projections or lugs |
| 17 | Discharge space |
| 18 | Gas-emitting insulation material |
| 19 | Embedded conductive trigger electrode |

What is claimed is:

1. Spark-gap arrangement encapsulated in a pressure-proof housing, for diverting harmful disturbances due to overvoltage, comprising at least two electrodes disposed substantially opposite one another in a housing that is conductive or provided with a conductive coating, between which a discharge space is formed and which are insulated from the housing, characterized in that directly by way of the conductive housing a trigger voltage can be applied to form a subsidiary spark gap in the discharge space, so that by way of the subsidiary spark gap the main spark gap between the main electrodes can be ignited.

2. Spark-gap arrangement according to claim 1, characterized in that the insulation between the discharge space and the housing is interrupted to create an opening in the region of the subsidiary spark gap that is to be formed.

3. Spark-gap arrangement according to claim 2, characterized in that within the opening there is disposed an insulating spacer piece adapted in shape to the housing, preferably ring-shaped, such that the spacer piece comprises at least one slitlike aperture or bore for the subsidiary spark gap.

4. Spark-gap arrangement according to claim 1, characterized in that the opposed electrodes enclose a cavity that forms a chamber-like discharge space.

5. Spark-gap arrangement according to claim 2, characterized in that in the opening there is disposed a conductive insert that is made of material resistant to burning away, extends into the discharge space, and is in contact with the conductive housing.

6. Spark-gap arrangement according to claim 5, characterized in that the electrodes have the form of cones pointing toward one another, such that the conductive insert is directed toward the cones on the opposite side to form the subsidiary spark gaps in two discharge spaces.

7. Spark-gap arrangement according to claim 6, characterized in that the conductive insert has a disc shape adapted at its outer circumference to the shape of the housing, with an opening such that the inner ends of the opening are reduced in thickness and point toward the electrodes.

8. Spark-gap arrangement according to claim 6, characterized in that the conductive insert is designed as a ring that comprises several bridges directed toward its center, such that the distances separating the bridges and the ring form at least part of the discharge space.

9. Spark-gap arrangement according to claim 2, characterized in that within the opening there is disposed an insert made of conductive plastic that reaches at least partially into the discharge space and has current-controlling properties.

10. Spark-gap arrangement according to claim 2, characterized by a rotationally symmetrical construction with respect to the middle long axis and a mirror-symmetric shape perpendicular to the middle long axis, as seen in section through the region of the opening in the insulation.

11. Spark-gap arrangement according to claim 1, characterized in that in the region bounded by the opposed electrode surfaces and the inside of the housing, with the exception off a section for the discharge space, a gas-emitting insulation material is situated, such that embedded in or inserted into the insulation material at least one trigger electrode is provided, which is in electrical contact with the conductive housing.

12. Spark-gap arrangement according to claim 11, characterized in that the trigger electrode is situated asymmetrically in the space between the electrodes, so that the short distance separating one of the main electrodes from the trigger electrode forms the subsidiary spark gap.

\* \* \* \* \*